(12) United States Patent
Blair et al.

(10) Patent No.: US 7,995,741 B1
(45) Date of Patent: Aug. 9, 2011

(54) APPEARANCE CHANGE PROMPTING DURING VIDEO CALLS TO AGENTS

(75) Inventors: Colin Blair, Westleigh (AU); Paul Thomas McNamara, Sydney (AU); Andrew W. Lang, Epping (AU); David Preshan Thambiratnam, Ashfield (AU); James K. Wan, Carlingford (AU)

(73) Assignee: Avaya Inc., Basking Ridge, NJ (US)

( * ) Notice: Subject to any disclaimer, the term of this patent is extended or adjusted under 35 U.S.C. 154(b) by 1470 days.

(21) Appl. No.: 11/388,656

(22) Filed: Mar. 24, 2006

(51) Int. Cl.
*H04M 3/00* (2006.01)
(52) U.S. Cl. .............................. 379/265.02; 379/265.01
(58) Field of Classification Search ............. 379/265.01, 379/265.02
See application file for complete search history.

(56) References Cited

U.S. PATENT DOCUMENTS

| | | | |
|---|---|---|---|
| 6,286,756 B1 * | 9/2001 | Stinson et al. | 235/379 |
| 6,845,178 B1 | 1/2005 | Evans et al. | |
| 2004/0024709 A1 * | 2/2004 | Yu et al. | 705/43 |
| 2004/0026500 A1 * | 2/2004 | Brikho | 235/379 |
| 2005/0224573 A1 * | 10/2005 | Yoshizane et al. | 235/379 |
| 2006/0097045 A1 * | 5/2006 | Tsutsui et al. | 235/383 |
| 2006/0110014 A1 * | 5/2006 | Philomin et al. | 382/118 |

* cited by examiner

*Primary Examiner* — Rasha S Al Aubaidi
(74) *Attorney, Agent, or Firm* — Sheridan Ross P.C.

(57) ABSTRACT

The present invention is directed toward a method and system for determining changes in a customer that have occurred between contact center visits. The invention is operable to compare data captured from a previous interaction and data captured from a current interaction and compare the two in order to determine if the customer has had any changes to their appearance or otherwise since their last contact center visit.

24 Claims, 5 Drawing Sheets

| CUSTOMER ID 304 | BASIC CUSTOMER INFO. 308 | IMAGE ARCHIVE 312 | LONG TERM TRENDS 316 | SHORT TERM TRENDS 320 |
|---|---|---|---|---|
| 1 | | [1][2][3] | - WEIGHT LOSS | - HAIR CUT<br>- GLASSES |
| 2 | | [1] | — | - NO SUIT |
| 3 | | [1][2][3][4][5] | - WRINKLES | - DIFFERENT LOCATION |
| ○ ○ ○ | | | | |
| M | | [1][2] | - HAIR GROWTH | - COSMETIC SURGERY |

FIG. 3

APPEARANCE CHANGE PROMPTING DURING VIDEO CALLS TO AGENTS

FIELD

The invention relates generally to servicing interactions in a contact center and specifically to identifying appearance changes of customers in a contact center.

BACKGROUND

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria.

Typically, when a contact enters a contact center, an IVR evaluates the content of the contact to determine the intent(s) defined by the contact's content. As used herein, "contact" or "interaction" refers to an atomic unit of work arriving at a contact center over a particular media channel or via implementation of a specific business process (activity).

Based on the determined content of the contact, the contact may be assigned to one of a number agents or an agent queue. The agent or agent queue that the contact is assigned to is one that hopefully can address the questions (e.g., the content) of the contact. The number of agents working in a contact center can be quite large, and because of this fact it is very infrequent that the same customer is assigned to the same agent every time that customer initiates a contact.

If an agent has previously handled a contact from a particular customer, the contact center server will try to assign a later contact from the same customer to the same agent. However, there are a number of circumstances that may make this troublesome or impossible. For example, if the agent that previously serviced the customer's contact is busy servicing another contact, the contact center will search to see if any other agents are available to handle the contact. If there are any idle agents, then the contact will be assigned to one of them in an attempt to increase contact center efficiency and customer satisfaction. In another example, the agent that previously serviced a customer's contact may not be working when the customer initiates another contact. In this case, the customer will be assigned to a different agent.

Since customers are constantly being assigned to different agents it becomes difficult to make the customer feel like they are an appreciated customer rather than another number in line. If a customer begins to feel like a number, that customer may choose to take their business somewhere else that gives them specialized attention.

There have also been attempts to make an interaction between a contact center agent and a customer easier on the contact center agent. For example, customer history (e.g., purchase history, location, number of contacts initiated, questions in previous contacts, previous agent's notes from previous contacts, and so on) may be maintained in a database and displayed to an agent while the agent is attempting to service the current contact. This information may be useful for the agent when he/she is trying to service the current contact. For instance, an agent may look at the customer's purchase history and decide to offer the customer a particular product based on his/her purchase history. Any additional information that can be provided to a contact center agent prior to or during an interaction may help to increase sales and customer satisfaction. Unfortunately, outside of maintaining purchase history and customer biographical data, the amount of information provided to agents in a contact center is somewhat limited.

Many contact centers are equipped to receive video contacts or other types of contacts that include images of the customer. These particular contacts make the interaction between the agent and the customer even more personal since they can see each other and the expressions on each other's faces. In these types of interactions it is all the more important to provide the agent with as much information as possible so that they can service the contact with a personalized touch.

Agents must be responsive, energetic, and perceptive in order to provide the customer with personalized service. It is easy for contact center agents to become lazy and not put forth the effort required to give this high level of service, and as a result profits and customers may be lost. If more information relating to a particular customer were available to agents before and during an interaction, it may be easier for the agent to provide a higher quality experience to the customer, thus resulting in more sales and higher customer satisfaction.

SUMMARY

Embodiments of the present invention are directed generally to the use of image comparison technology to identify changes in customer appearance since the customer's last contact, which may be used not only by the agent during a contact but may also be used in subsequent contacts serviced by the same or a different agent.

In one embodiment, the present invention is directed to a method for identifying appearance differences in a customer. The method includes the steps of:

receiving a first contact from a customer in a contact center;

capturing at least one image of the customer from the first contact; and comparing the at least one captured image from the first contact to an image of the customer captured from a previously received contact.

By comparing the customer image from the recently received first contact with a customer image from a previously received contact, appearance changes in the customer and/or the surroundings of the customer can be determined and provided to an agent of the contact center.

As used herein an "image" may correspond to any type of still picture and/or moving picture. The image may be accompanied by or associated with audio information. Generally, an image is a still picture that has been taken from a video stream. The image may be in digital or analog form. However, for processing and storage purposes, it is typically advantageous to convert any analog images into a digital representation of the same image.

An image for a contact is typically captured when the contact is received by the contact center. An archived image that is associated with the same customer is retrieved from a database. The archived image and the currently captured image can then be compared to see if the customer has had any changes to their appearance since the last contact was initiated (assuming an image was captured during the last contact). As noted above, appearance changes may correspond to the appearance of the customer or to changes to surroundings of the customer. Examples of typical appearance changes that may be identified by comparing two images include, but are not limited to, hair length/style changes, skin color changes (e.g. a tan), height/weight changes, differences in clothing style, change in background/surroundings, expression or mood changes, and so on.

The agent in the contact center may use the identified changes in appearance to help provide more personalized service. Additionally, changes in appearance may be tracked over the course of time so that trends may be identified. A number of identified short-term changes or differences between recent images can be correlated to help determine if any long-term trends are developing. Alternatively, one fairly old image could be compared to a relatively new image to determine if any long-term changes or trends have occurred.

Once differences between images have been identified, the differences can be displayed to an agent of the contact center in a number of different ways. One way the differences could be displayed is by preparing a version of the recently captured image that highlights any differences between the new image and the older image. The highlighting may simply be a change in the intensity of the image around the areas of noted differences. The highlighting may also be an arrow or some other indicator that points to noted differences between the two images. Additionally, the display of the differences may include a caption that explains what the differences between the images are. For example, if customer had brown hair in a first older image and the newer image shows the customer with blonde hair, the caption may include something saying "Different Hair Color." A number of different instances can be envisioned where noting an appearance change and displaying that noted change to a contact center agent would be beneficial.

In one embodiment, the present invention is directed to a method for displaying at least two images to a contact center agent. The method includes the steps of:

receiving an incoming and/or outgoing first contact from a first customer, the received incoming and/or outgoing first contact having a first visual image of the first customer;

assigning the first contact to a first agent for servicing; and presenting at the first image and a second image of the first customer to the first agent at substantially the same time, where the second image was received in an earlier, different contact with the first customer, whereby the agent can discern differences between the first and second images for use in servicing the customer.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

FIG. 3 is a logical representation of data in a contact center database in accordance with at least some embodiments of the present invention;

DETAILED DESCRIPTION

The invention will be illustrated below in conjunction with an exemplary communication system. Although well suited for use with, e.g., a system having an ACD or other similar contact-processing switch, the invention is not limited to use with any particular type of communication system switch or configuration of system elements. Those skilled in the art will recognize that the disclosed techniques may be used in any communication application in which it is desirable to identify appearance differences in a customer that have occurred between times that the customer has initiated a contact.

Figure 1:
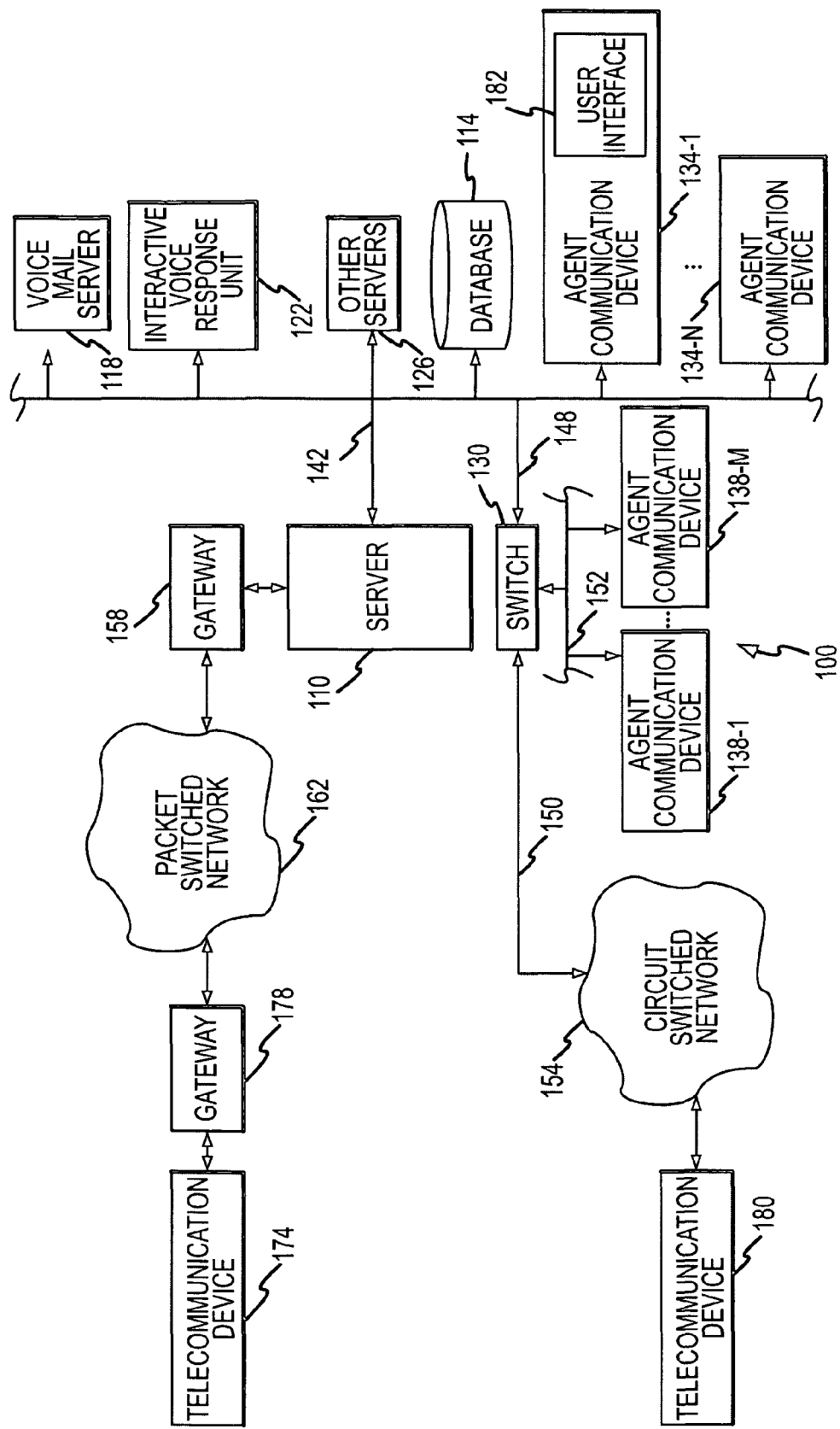
FIG. 1 is a block diagram depicting a contact center in accordance with at least some embodiments of the present invention.

FIG. 1 shows an illustrative embodiment of the present invention. A contact center 100 comprises a central server 110, a set of data stores or databases 114 containing contact or customer related information and other information that can enhance the value and efficiency of the contact, and a plurality of servers, namely a voice mail server 118, an Interactive Voice Response unit or IVR 122, and other servers 126, a switch 130, a plurality of working agents (not shown) operating packet-switched (first) telecommunication devices 134-1 to N (such as computer work stations or personal computers) having a user interface 182, and/or circuit-switched (second) telecommunication devices 138-1 to M (which may also have a user interface 182), all interconnected by a local area network LAN (or wide area network WAN) 142. The servers 126 can be connected via optional communication lines 148 to the switch 130. As will be appreciated, the other servers 126 can also include a scanner (which is normally not connected to the switch 130 or Web server), VoIP software, video contact software, voice messaging software, an IP voice server, a fax server, a web server, and an email server, SMTP and POP3 servers for relaying and receiving emails respectively, chat server to host chat sessions, instant messaging gateways, SMS/MMS gateways for receiving SMS/MMS messages through a mobile device, context analysis appliances, auto-responders, VoIP gateways, and the like.

The switch 130 is connected via a plurality of trunks 150 to the Public Switch Telecommunication Network (PSTN) 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, an enterprise server, or other type of telecommunications system switch or server, as well as other types of processor-based communication control devices such as media servers, computers, adjuncts, etc.

Referring to FIG. 1, the gateway 158 can be any suitable gateway device, such as Avaya Inc.'s, G700™, G600™, MCC/SCC™ media gateways and may be implemented as hardware such as via an adjunct processor (as shown) or as a chip in the server.

The first telecommunication devices 134-1 . . . 134-N are packet-switched and can include, for example, IP hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1 . . . 138-M are circuit-switched. Each of the telecommunication devices 138-1 . . . 138-M corresponds to one of a set of internal extensions. The switch/server can direct incoming contacts to and receive outgoing contacts from these extensions in a conventional manner. The second telecommunication devices can include, for example, wired and wireless telephones, PDAs, H.320 video phones and conferencing units, voice messaging and response units, and traditional computer telephony adjuncts.

It should be noted that the invention does not require any particular type of information transport medium between switch or server and first and second telecommunication devices, i.e., the invention may be implemented with any desired type of transport medium as well as combinations of different types of transport media.

The packet-switched network 162 can be any data and/or distributed processing network, such as the Internet. The network 162 typically includes proxies, registrars, and routers for managing packet flows.

The packet-switched network 162 is in communication with an external first telecommunication device 174 via a gateway 178, and the circuit-switched network 154 with an external second telecommunication device 180. These telecommunication devices are referred to as "external" in that they are not directly supported as telecommunication device endpoints by the switch or server. The telecommunication devices 174 and 180 are an example of devices more generally referred to herein as "external endpoints."

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements.

Figure 2:
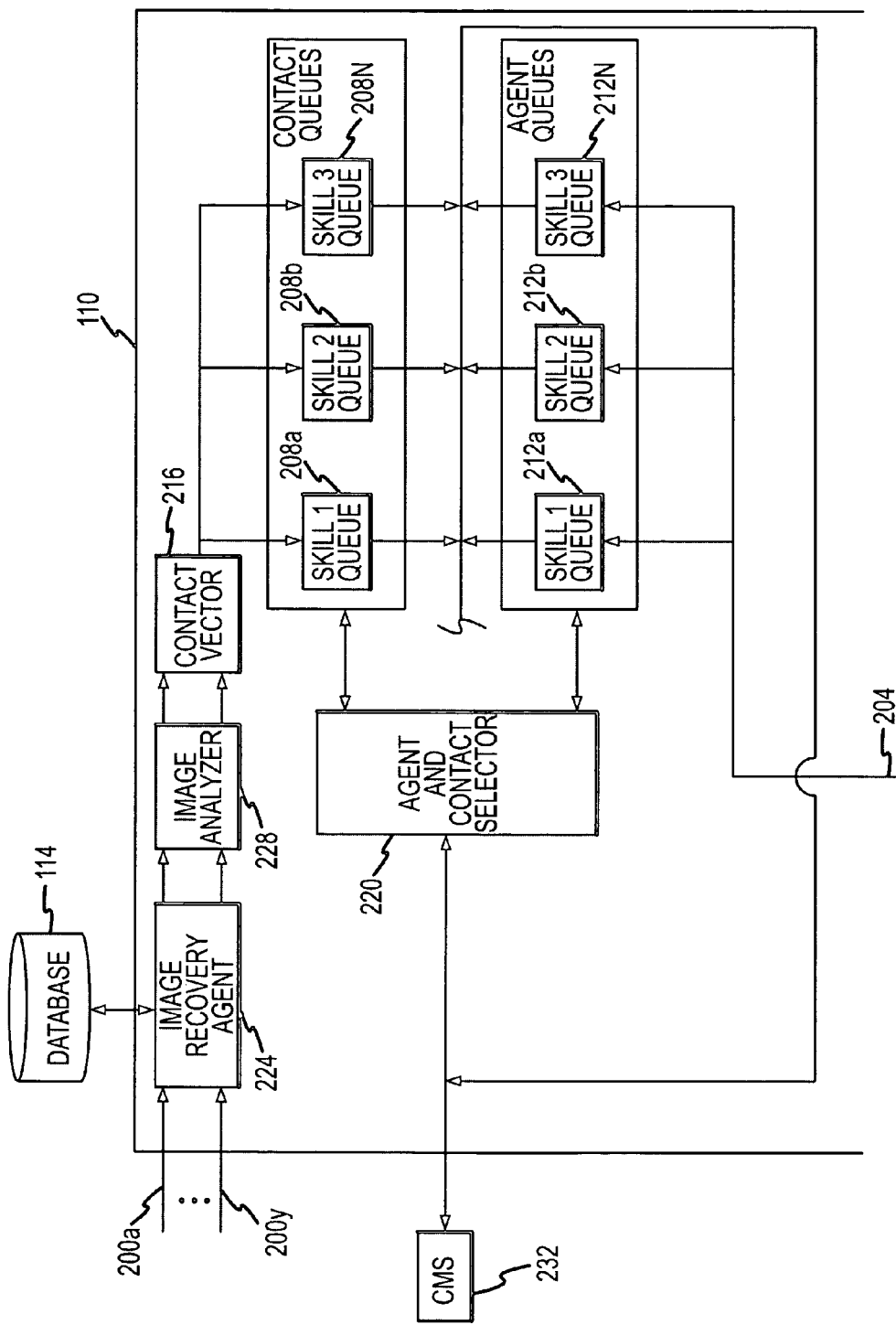
FIG. 2 is a block diagram depicting a server in accordance with at least some embodiments of the present invention.

Referring to FIG. 2, one possible configuration of the server 110 is depicted. The server 110 is in communication with a plurality of customer communication lines 200*a*-*y* (which can be one or more trunks, phone lines, etc.) and agent communication line 204 (which can be a voice-and-data transmission line such as LAN 142 and/or a circuit switched voice line 140). The server 110 can include a Call Management System™ or CMS 232 that gathers call records and contact-center statistics for use in generating contact-center reports.

Included among the data stored in the server 110 are a set of contact queues 208*a*-*n* and a separate set of agent queues 212*a*-*n*. Each contact queue 208*a*-*n* corresponds to a different set of agent skills, as does each agent queue 212*a*-*n*. Conventionally, contacts are prioritized and either are enqueued in individual ones of the contact queues 208*a*-*n* in their order of priority or are enqueued in different ones of a plurality of contact queues that correspond to a different priority. Contacts in a common queue need not be of the same media type. For example, one contact queue could contain VoIP calls, telephone calls, video calls, emails, and chats. Furthermore, a single contact could be a physical representation of a grouping of different media types, e.g., one contact may be a grouping of emails and calls from a similar customer or even from different customers related to the same subject matter. Likewise, each agent's skills are prioritized according to his or her level of expertise in that skill, and either agents are enqueued in individual one of agent queues 212*a*-*n* in their order of expertise level or are enqueued in different ones of a plurality of agent queues 212*a*-*n* that correspond to a skill and each one of which corresponds to a different expertise or skill level. Included among the control programs in the server 110 is a contact vector 216. Contacts incoming to the contact center are assigned by contact vector 216 to different contact queues 208*a*-*n* based upon a number of predetermined criteria, including customer identity, customer needs, contact center needs, current contact center queue lengths, contact media type, customer value, and the agent skill that is required for the proper handling of the contact. Agents who are available for handling contacts are assigned to agent queues 212*a*-*n* based upon the skills that they possess. An agent may have multiple skills, and hence may be assigned to multiple agent queues 212*a*-*n* simultaneously. Furthermore, an agent may have different levels of skill expertise (e.g., skill levels 1-N in one configuration or merely primary skills and secondary skills in another configuration), and hence may be assigned to different agent queues 212*a*-*n* at different expertise levels. Additionally, agents can be non-human contact handling media. For instance, a recording device may be the "agent" that a contact is directed to as an intermediate step to assigning a human agent to processing the contact. The definition of agent need not be limited to human contact servicing agents.

The server 110 further comprises an image recovery agent 224 that is in communication with the database 114 and an image analyzer 228. When a contact enters the contact center 100 it is received at the server 110. In the event that the contact is a VoIP call, video call, or other type of contact that utilizes image data, the image recovery agent 224 is operable to capture one or more still picture images of the customer. The image recovery agent 224 is further operable to identify or use the already determined identity of the customer to reference the database 114 to determine if any other images have been stored for the given customer. If the customer has initiated a contact previously and some amount of image data is available, the image recovery agent 224 references the image data and creates a pointer between the instant contact and the stored images. Subsequent devices may reference the image data in the database 114 by using the pointer created by the image recovery agent 224. Alternatively, the image recovery agent 224 may create copies of the stored images and place them within the contact container for later use by other devices.

The image analyzer 228 is operable to compare and analyze image data retrieved by the image recovery agent 224 in order to make additional deductions about the customer of the contact. For example, the image analyzer 228 may take an image from the previous contact the customer initiated and compare it to the image that was just captured by the image recovery agent 224 in the current contact. The image analyzer 228 may overlay one image on top of the other and determine what differences exist between the two. By comparing the most recent image to the image captured from the contact that occurred immediately previous to the current contact, the image analyzer 228 can make a determination about any short-term changes (assuming the time between contacts is relatively short, i.e., hours, days, weeks or even months) that have occurred to the customer.

The image analyzer 228 may also compare older images captured from previous contacts (e.g., images that are months or years old) to determine if any long-term changes have occurred to the customer. The image analyzer 228 may register both the short and long-term changes and include that information in the contact, thus change information may be displayed to an agent upon the connection of the agent and the contact. The short and long-term changes may also be sent back to the database 114 and saved for future reference.

The image analyzer 228 operates to compare older and newer images by creating a mathematical representation of each image. For example, the image may be divided into a number of distinct areas (e.g., the image is pixilated) and each pixel is given a relative score for the amount of darkness or color that it contains. The image analyzer 228 takes each image and attempts to match certain features from the face (e.g., the center of the customer's pupils, insider corner of the eyes, ears, nose, corners of the mouth, eyebrows, chin, etc.) and/or body (neck, shoulders, torso, and the like) of the customer in the older image to the same features of the customer in the newer image. Once the images are satisfactorily matched to each other (e.g., the face of the customer in the older image is in relatively the same position as the face of the customer in the newer image), the overlapping pixel values are subtracted from each other. If there is a large difference between pixel values, the image analyzer 228 is operable to determine that a change has occurred between the images. For example, if in a previous contact a customer did not have glasses and in a subsequent contact the customer did have glasses, the pixel values for each pixel that displays the glasses will probably be different from the corresponding pixel values (of skin) from the previous image. The difference can be noted and the relative shape of the different valued pixels may also be analyzed. The shapes of different valued pixels might be two circles connected by one or more line segments in the case of a pair of glasses. The image analyzer 228 is operable to determine possible shapes of the different valued pixels and determine what the shape(s) may correspond to.

In an alternative embodiment, the image analyzer 228 simply highlights the pixels that have substantially different values and is able to create a third image showing the highlighted pixels. This third image may be presented to an agent when the contact is assigned to him/her and the agent can then view the third image and see the highlighted pixels. It would then be up to the agent to determine exactly what difference exists between the older and newer image.

There are a number of other ways to analyze and compare different images in order to make a determination about the difference(s) between them. For example, in U.S. Pat. No. 6,845,178 to Evans et al. a method and apparatus for characterizing pixels in an image of an object surface is provided. The surface is characterized into various qualitative attributes by separating pixels comprising an image of the surface into regions representing the attributes. Essentially, at least two images of the same surface are used and the location of each pixel in each image is matched to be substantially the same, but the values of the pixels at each location may be different. The set of pixel values for each unique location is compared to an identification matrix, which includes reference sets of pixel values and their corresponding regions. Each unique pixel location is then assigned to a region based on the results of the comparison. This all is done in an attempt to identify qualitative aspects of a surface.

Once the most recently captured image has been compared to previous images, assuming there are any, the contact is assigned to one or more of the contact queues 208a-n by the contact vector 216. Of course, a contact may be assigned to a given queue prior to completion of any image analysis. The image analyzer 228 may compare images for a contact while the contact is waiting in queue for service. This way the customer does not have to wait for an excessive amount of time for the image analyzer 228 to complete its analysis of the image(s). However, it is preferable to have the images analyzed prior to connecting the contact to an agent. This is preferable because if the agent has the results of the image analysis available to him/her immediately when the agent receives the contact, the agent will be able to comment on any perceived differences at the beginning of the conversation rather than minutes later where the effect of noticing such a difference may not be as impressive or useful.

As can be appreciated by one of skill in the art, a communication device 134 and/or 138 comprising an image recovery agent 224 and an image analyzer 228 may also be operable to compare two images of a customer in order to determine if any appearance differences exist between the two images. A processor, preferably a digital signal processor, may execute functions of the image recovery agent 224 and image analyzer 228 by implementing algorithms stored in a memory of the communication device and/or the database 114.

Referring now to FIG. 3, information in a database 300 used for maintaining customer and image data will be described in accordance with at least some embodiments of the present invention. The database 300 comprises a customer identification field or name field 304, a basic customer information field 308, an image archive field 312, a long-term trends field 316, and a short-term trends field 320. The image recovery agent 224 references information in the database 300 when a new contact enters the contact center as noted above. The contact is connected to information in the database 300 through pointers identifying the location or address of such information in the database 300. When a contact enters a contact center, an IVR or some other mechanism will ask the customer certain questions so that the customer can be identified. Once the customer is identified the customer's associated information is easily accessible.

The customer identification field 304 may contain a number assigned to a given customer or possibly a name of the customer. The basic customer information may include the address and purchase history along with any other useful information that is typically maintained in contact centers. The image archive 312 stores images, or at least pointers to images in the database 114, that were retrieved and stored for the corresponding customer. For example, the first customer has three images associated with him/her and stored in the image archive 312. This particular customer may be an older customer that does not necessarily initiate a lot of contacts with the contact center. The second customer has only one image shown in the image archive 312. The second customer might be a newer customer and thus has less image history available. The third customer has five images associated with him/her stored in the image archive 312. This particular customer may have initiated a number of contacts over the course of time and thus has a number of images stored in the image archive 312.

Since the first and third customers have a number of images stored in the image archive 312 it may be possible for the image analyzer 228 to make a long-term trend analysis for these customers. The image analyzer 228 can take the oldest or an older image stored in the image archive 312 and compare that image with a recently recovered image. Based on the determined differences between the two images, or based on a number of short-term trends, the image analyzer 228 is able to make a long-term trend analysis for the customer. For example, the first customer may have lost a significant amount of weight over the course of a couple years. The image analyzer 228 will be able to identify these changes and forward that information on to the agent that is assigned to the contact. This way, when the interaction begins between the agent and the customer, the agent (even if the agent has never handled a contact from this customer before) will be able to quickly comment on how healthy the customer looks based on the weight loss.

Additionally, the image analyzer 228 may be able to determine that wrinkles have been forming on the third customer. This information can be forwarded on to the agent that is assigned to the contact. The agent may be able to offer the customer certain products based on these determined long-term trends in a gentle way that does not offend the customer but does make him/her aware of other products that might help with the wrinkles that have been growing over the years.

In a similar fashion, the image analyzer 228 is operable to make short-term observations about changes in the customer. For example, the image analyzer 228 can compare an image from a customer that was recovered when the customer last initiated a contact with an image that was recovered during the current contact. During the comparison of these images, the image analyzer 228 may have determined that the customer has had a haircut since the last interaction or is in a different location.

Generally, the image analyzer 228 makes a note of any short or long-term change to a customer since his/her last contact. However, the image analyzer 228 is also able to sort through potentially useless changes in order to point out the more relevant changes. For example, if the customer is calling in from a hair salon or is a known model, the image analyzer 228 may make hairstyles a known change or at least display this particular change to the agent with some amount of emphasis because such a change may be more important to notice than a change in scenery would. In the event that the customer is a travel agent or is calling into a travel agency, the image analyzer 228 may place more emphasis on the surroundings of the customer rather than the physical appearance of the customer. Of course, the image analyzer 228 can display all detected differences to the agent, but it may be more efficient to simply display the important changes to the agent so that he/she is not inundated with so many changes that the agent is unable to comment on any one of them.

Figure 4:
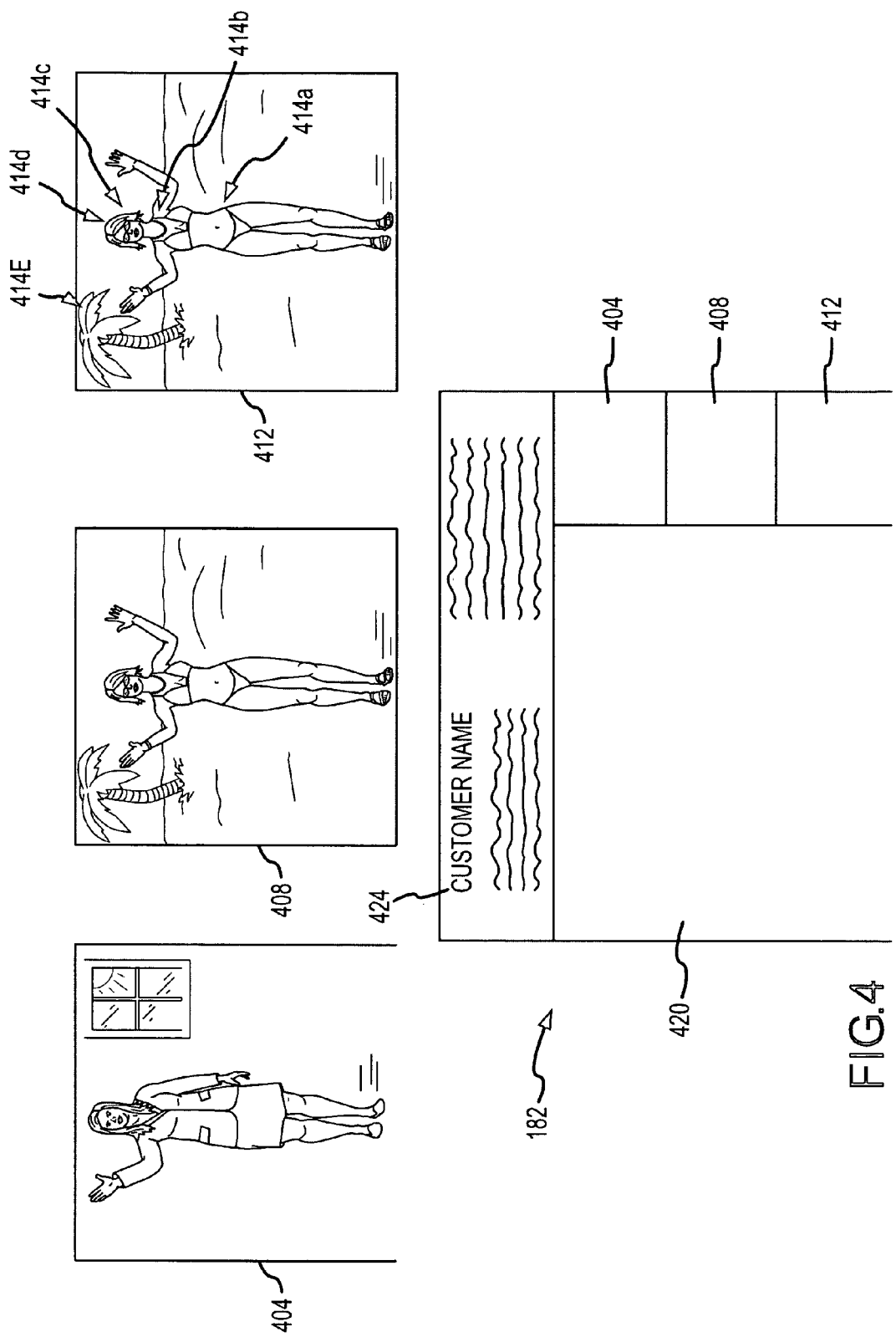
FIG. 4 is an example of an agent's user interface in accordance with at least some embodiments of the present invention.

Referring now to FIG. 4 a user interface 182 on an agent's communication device 134 or 138 will be described in accordance with at least some embodiments of the present invention. The user interface 182 may comprise a receiver for receiving voice signals from the agent and for transmitting voice signals to the agent, a keypad, a mouse, and an LCD display, plasma display, or any other type of image projection system. The user interface 182 is generally used to display information relating to the customer and the contact to the agent in a convenient manner such that the agent can use the information to better serve the customer.

The first image 404 may correspond to an image that was retrieved from the image archive 312. The first image 404 is typically from a different time and from a different previous contact. The second image 408 may be an image that was recovered during the current contact. Generally there is an amount of time that has passed between the first image 404 and the second image 408. The amount of time that has passed may be relatively large (e.g., months or years) in which case a long-term trend may be determined by comparing the two images. The amount of time that has passed may be relatively small (e.g., hours, days, weeks, or months) in which case a short-term trend may be determined by comparing the two images. Additionally, the first and second image 404 and 408 may have been captured during the same contact. Especially if it has taken an extraordinarily long amount of time for the contact to reach the head of the contact queue and be assigned to an agent, the first image 404 may correspond to when the contact first entered the contact center and the second image 408 may correspond to a time after the contact first entered the contact center. The comparison of these two images may be useful in determining how a customer is reacting to the long wait time and may help the agent when he/she attempts to service the contact.

The third image 412 is a highlighted version of the second image 408 that is highlighting or otherwise pointing out differences between the first and second image 404 and 408. Some times the differences may be so obvious that the agent will not need assistance in noticing them. However, the differences may be very subtle and by having the image analyzer 228 highlight the difference, the agent's attention can be drawn to the differences. As can be seen in the third image 412, the differences are noted with markers 414*a-e*. Each marker 414 corresponds to a different detected difference between the first image 404 and the second image 408. The marker 414*a* is highlighting the customer's weight difference whereas the marker 414*e* is highlighting the change in the customer's surroundings. As noted above, certain differences may be given different consideration and thus may be marked differently depending upon the amount of importance placed on such a difference. As noted above, the markers may be accompanied by a quick description of what the image analyzer 228 believes the differences between the images to be. For example, the marker 414*c* may be accompanied by a caption saying "haircut" while marker 414*d* may be accompanied by a caption saying "glasses."

The user interface 182 may be divided into a number of different sections. Each section can be used to display a different image or present different information to the agent. The images 404, 408, and 412 may be displayed on the periphery of the user interface 182 while the live video/image feed is displayed in the larger section 420. Additional customer information may be displayed in section 424. All of the information in section 424 is typically made available for an agent before or immediately when the contact is connected to the agent. The agent can use the customer information in section 424 along with the images 404, 408, and 412 to help provide the best service possible to a customer.

In accordance with at least one embodiment of the present invention, each customer image may be time-stamped when it is captured from the video stream. The time-stamped image may then be stored in the database 114 until the same customer initiates another contact. A second image may be captured and time-stamped some time after the first image was captured. Then each image, i.e. the first and second time-stamped images, may be displayed to an agent in the contact center without comparing the images in order to create a third image 412. The agent can then be enabled to compare the older image with the newer image and then make a determination of the differences between the two images. If the customer initiates more contacts at a later time, an image of the customer from each subsequent contact may also be captured and time-stamped. All of the time-stamped images may be displayed to a servicing agent for the agent to compare. Thus, the server 110 does not have to make a comparison between the two images and processing resources can be conserved.

Figure 5:
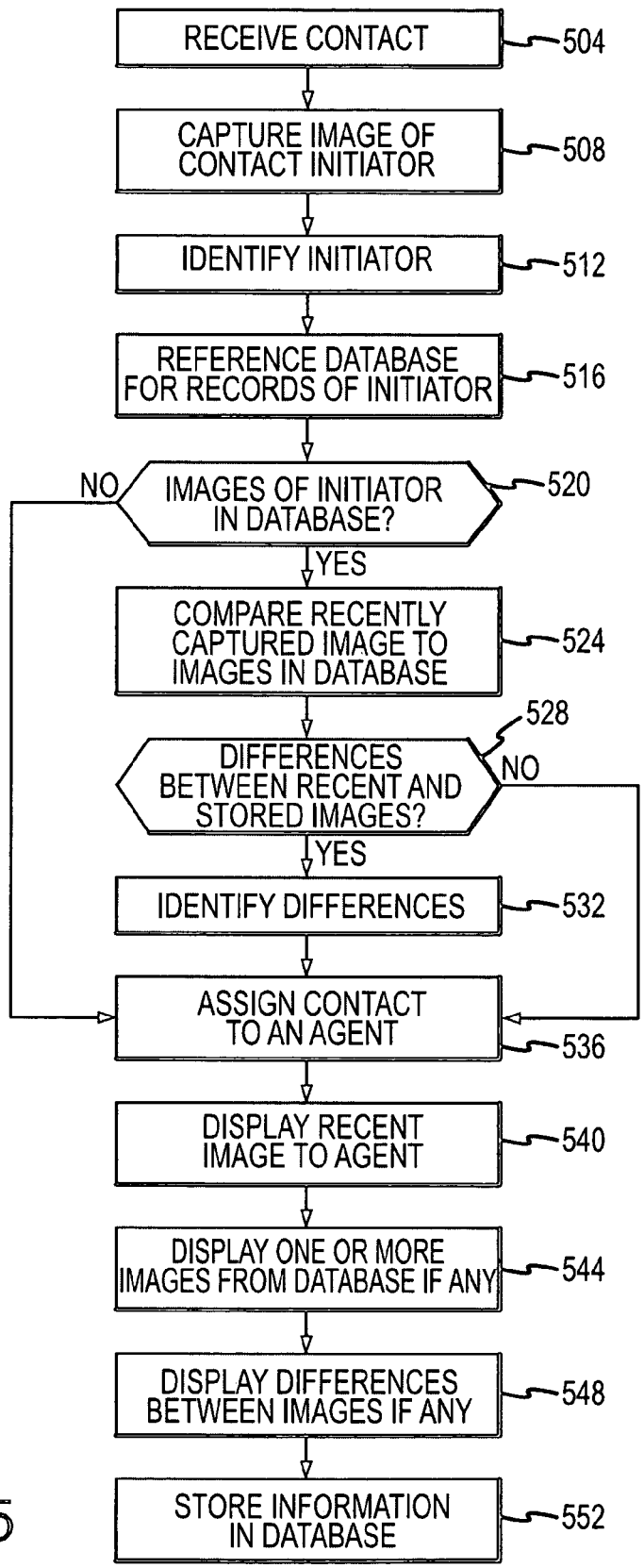
FIG. 5 is a flow chart depicting a method for identifying appearance changes during a contact in accordance with at least some embodiments of the present invention.

Referring now to FIG. 5 a method of identifying appearance changes will be described in accordance with at least some embodiments of the present invention. The method begins when a contact is received in the contact center 100 (step 504). Thereafter, the image recovery agent 224 captures one or more still images from the current contact (step 508).

In step 512, the identity of the customer/initiator is determined. The identity of the customer may be determined by performing an image analysis or the customer may be identified by other known methods. For example, the IVR 122 may request and collect the information from the customer when the contact is received in the contact center 100. Alternatively or in combination, address based identification may be performed to identify the customer or at least a company associated with the customer. For example, a Dialed Number Identification Service (DNIS) may be employed to help determine what number the customer called and possibly who the customer is, based on the number called. In a further alternative, the customer may be identified by caller identification information sent with the call.

With the identity of the customer known, the image recovery agent 224 can reference the database 114 for records of the customer (step 516). The records that can be referenced and pulled from the database 114 may include customer information and purchase history. The image recovery agent 224 also determines if any images of the customer exist in the database 114 (step 520). In the event that at least one image is stored in the database 114, the image recovery agent forwards both the archived image and the recently captured image to the image analyzer 228 where the two images are compared (step 524). If there are no images of the customer in the database 114, then the contact is simply assigned to an agent or a queue to wait for an available agent (step 536).

After the image analyzer 228 has compared the images, differences between the images are determined (step 528). Sometimes there may be no differences that can be determined between the first and second image 404 and 408 and if this is the case then the contact is assigned to an agent or a queue to wait for an available agent (step 536). If the image analyzer 228 was able to determine some differences between the images, then those differences are identified with a marker or by preparing a description of the changes that have occurred (step 532).

Once the image differences have been identified then the contact is assigned to an agent or a queue to wait for an available agent (step 536). As noted above, steps 516 through 532 may be performed in whole or in part after the contact has been assigned to an agent or while the contact is waiting in a queue for the next available agent.

Eventually the contact is assigned to an agent and the agent begins to service the contact. When the information is ready, preferably when the contact is connected to the agent, the recently captured image is displayed to the agent (step 540). In step 544, one or more images that were recovered from the database 114 are displayed to the agent on his/her communication device's user interface 182. The differences between the recently captured image and the archived images are also displayed to the agent (step 548). The agent then continues to service the contact until it is completely serviced or the agent has serviced the contact as much as he/she possibly could. If the contact needs more issues addressed, the agent may forward the contact on to another agent and the information that was previously presented to the original agent will be also presented to the subsequent agent. As the agent(s) continue to service the contact they can edit the information relating to the customer/contact. For example, the servicing agent may determine through the course of the interaction that the customer has other short or long-term changes that should be noted for future use. The agent can enter this information using the user interface 182 and the information can be maintained in along with other customer information in the database 114. The images that have been used including those that were produced to show short and long-term trends can also be stored in the database 114 for future use (step 552). As can be appreciated by one of skill in the art, as more information is made available to contact center agents, the more likely they will be able to service the contact to the customer's satisfaction.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   receiving a first contact from a customer in a contact center that includes an automatic call distribution system for assigning the first contact to one of a number of agents or an agent queue;
   capturing at least one image of the customer from the first contact; and
   comparing the at least one captured image from the first contact to an image of the customer captured from a previously received contact and providing appearance changes in one or more of the customer and surroundings of the customer to an agent of the contact center,
   wherein the at least one captured image comprises at least one feature in common with the image captured from a previously received contact, further comprising:

dividing both the at least one captured image and the image captured from a previously received contact into a number of pixels;

determining an intensity value for at least one pixel of each image;

matching the at least one captured image and the image captured from a previously received contact based upon the at least one feature in common such that a first set of pixels from the at least one captured image corresponds to a first set of pixels from the image captured from a previously received contact; and finding a difference in the intensity value between the first set of pixels from the at least one captured image and the first set of pixels from the image captured from a previously received contact.

2. The method of claim 1, wherein the previously received contact is associated with the customer of the first contact.

3. The method of claim 1, further comprising:
identifying the customer;
retrieving from a database of images the image captured from a previously received contact based upon identifying the customer; and
wherein the customer is in the at least one captured image from the first contact, and wherein the customer appears in the image captured from a previously received contact.

4. The method of claim 1, further comprising:
identifying at least one difference between the at least one captured image and the image captured from a previously received contact; and
displaying the at least one difference to an agent of the contact center.

5. The method of claim 4, wherein the displaying comprises showing the agent (i) at least one of the at least one captured image and the image captured from a previously received contact and (ii) an image highlighting the at least one difference.

6. The method of claim 4, wherein the displaying comprises creating a portion of text that describes the at least one difference and displaying the portion of text to the agent.

7. The method of claim 1, further comprising:
comparing the at least one captured image with a number of different images captured from different previously received contacts, wherein each previously received contact was received at a different time;
determining a difference between the at least one captured image and each of the number of different images;
comparing each difference between the at least one captured image and each of the number of different images; and
determining whether a trend is occurring based on each difference between the at least one captured image and each of the number of different images.

8. A non-transitory computer readable medium comprising executable instructions operable to perform the method of claim 1.

9. A contact center, comprising:
an agent communication device operable to service incoming and/or outgoing customer contacts the contact center including an automatic call distribution system for assigning a contact to one of a number of agents or an agent queue;
an input operable to receive a first contact from a first customer for servicing by the agent communication device;
an image recovery agent operable to capture at least one image from the first contact and retrieve an image from a previously received contact; and
an image analyzer operable to compare the at least one image captured from the first contact with the image from a previously received contact and to provide appearance changes in one or more of the first customer and surroundings of the first customer to an agent of the contact center, wherein the at least one captured image comprises at least one feature in common with the image captured from a previously received contact, wherein both the at least one captured image and the image captured from a previously received contact are divided into a number of pixels, and wherein the image analyzer is further operable to determine an intensity value for at least one pixel of each image, match the at least one captured image and the image captured from a previously received contact based upon the at least one feature in common such that a first set of pixels from the at least one captured image corresponds to a first set of pixels from the image captured from a previously received contact, and to find a difference in the intensity value between the first set of pixels from the at least one captured image and the first set of pixels from the image captured from a previously received contact.

10. The contact center of claim 9, wherein the previously received contact is associated with the first customer.

11. The contact center of claim 9, further comprising a database of images, wherein the image recovery agent is further operable to identify the first customer and based upon identifying the first customer, to retrieve from the database the image captured from a previously received contact, wherein the first customer appears in the at least one captured image from the first contact, and wherein the first customer is in the image captured from a previously received contact.

12. The contact center of claim 9, wherein the agent communication device comprises a user interface, wherein the image analyzer is further operable to identify at least one difference between the at least one captured image and the image captured from a previously received contact and communicate the at least one difference to the user interface, and wherein the user interface is operable to display the at least one difference.

13. The contact center of claim 12, wherein the at least one captured image, the image captured from a previously received contact, and an image highlighting the at least one difference is displayed by the user interface.

14. The contact center of claim 12, wherein the image analyzer is further operable to create a portion of text that describes the at least one difference, and wherein the portion of text is displayed by the user interface.

15. The contact center of claim 12, wherein the user interface is divided into a number of sections, wherein a first section displays the at least one captured image, wherein a second section displays the image captured from a previously received contact, wherein a third section displays an image showing the at least one difference, and wherein a fourth section display a live video feed of the first customer.

16. The contact center of claim 12, wherein the at least one difference corresponds to a change in appearance of the first customer.

17. The contact center of claim 9, wherein the image analyzer is further operable to compare the at least one captured image with a number of different images captured from different previously received contacts, wherein each previously received contact was received at a different time, determine a difference between the at least one captured image and each of the number of different images, compare each difference between the at least one captured image and each of the number of different images, and determine whether a trend is occurring based one each difference between the at least one captured image and each of the number of different images.

18. The contact center of claim 17, wherein the trend is a long term trend that is determined by comparing the at least one captured image with an oldest image of the number of different images.

19. A method, comprising:
  in a contact center, that includes an automatic call distribution system for assigning a contact to one of a number of agents or an agent queue, the contact center comprising a plurality of agents for servicing incoming and/or outgoing contacts, at least one queue for holding contacts awaiting service and an agent and contact selector for assigning incoming and/or outgoing contacts in the queue to agents for servicing, receiving an incoming and/or outgoing first contact from a first customer, the received incoming and/or outgoing first contact comprising a first visual image of the first customer;
  assigning the first contact to a first agent for servicing;
  presenting at least substantially simultaneously to the first agent the first image and a second image of the first customer, the second image being received in an earlier, different contact with the first customer, whereby the agent can discern differences between the first and second images for use in servicing the customer, wherein the first image comprises at least one feature in common with the second image, further comprising:
  dividing both the first image and the second image into a number of pixels;
  determining an intensity value for at least one pixel of each image;
  matching the first image and the second image based upon the at least one feature in common such that a first set of pixels from the first image corresponds to a first set of pixels from the second image; and
  finding a difference in the intensity value between the first set of pixels from the first image and the first set of pixels from the second image.

20. The method of claim 19, further comprising time-stamping at least one of the first and second image and presenting the at least one time-stamped first and second image to the first agent.

21. The method of claim 19, further comprising:
  comparing the first and second image;
  identifying at least one difference between the first and second image; and
  displaying the at least one difference to the first agent.

22. The method of claim 21, wherein the displaying comprises showing the agent the at least one of the first, second, and a third image highlighting the at least one difference.

23. The method of claim 21, wherein the displaying comprises creating a portion of text that describes the at least one difference and displaying the portion of text to the first agent.

24. A non-transitory computer readable medium comprising executable instructions operable to perform the method of claim 19.

\* \* \* \* \*